United States Patent [19]
Armstrong

[11] 3,782,505
[45] Jan. 1, 1974

[54] BRAKING DEVICE

[75] Inventor: Homer T. Armstrong, Arlington, Tex.

[73] Assignee: LTV Aerospace Corporation, Dallas, Tex.

[22] Filed: Feb. 25, 1972

[21] Appl. No.: 229,464

[52] U.S. Cl. .................................. 188/1 C, 293/70
[51] Int. Cl. .............................................. F16f 7/12
[58] Field of Search ...................... 188/1 C; 293/70, 293/89

[56] References Cited
UNITED STATES PATENTS

| | | | |
|---|---|---|---|
| 3,412,828 | 11/1968 | Daniels | 188/1 C X |
| 3,482,653 | 12/1969 | Maki et al. | 188/1 C |
| 3,628,634 | 12/1971 | Valukonis | 188/1 C |
| 3,697,108 | 10/1972 | Diener | 188/1 C X |

Primary Examiner—Duane A. Reger
Attorney—H. C. Goldwire

[57] ABSTRACT

A device for braking and dissipating the kinetic energy of a linearly moving object. The device employs an elongated probe rigidly attached to the object to be braked, the probe having at least one cutting edge. A strip of sheet material is removably mounted on the probe and over the probe's cutting edge. Means for holding and positioning a shearing member is slidingly mounted on the probe with the strip of sheet material between the probe and the shearing member. The shearing member cooperates with the probe's cutting edge to shear and deform the strip during movement of the shearing member relative to the probe and strip. Such movement of the shearing member is effected by the passage of the probe through an open end of a fixed structure, which open end is larger than the combined cross-sectional dimensions of the probe and strip of sheet material, but smaller than the outside dimension of the means for holding and positioning the shearing member.

19 Claims, 22 Drawing Figures

BRAKING DEVICE

This invention relates to devices used to brake a linearly moving object, and more particularly to a braking device that utilizes the kinetic energy of the object to be braked to perform work, such as shearing and deforming, on an expendable component of the braking device.

There are many kinetic-energy braking and/or absorbing devices used in industry today, but they are all readily divided into three broad groups or categories. The first group includes those devices which utilize the generation of frictional forces between braking surfaces to dissipate the kinetic energy of the object to be braked by converting the kinetic energy to heat. The second group includes dashpots, hydraulic energy-absorbers, and fluid, piston-cylinder devices. The third group includes those devices which utilize the kinetic energy of the object to be braked to deform, broach, or shear an expendable component of the braking device, thereby dissipating the kinetic energy of the object.

The devices in the first group have braking forces which may vary with temperature or surface conditions. For example, the coefficients of friction for a given set of braking surfaces vary with braking-surface temperature changes, use (wear-produced surface changes), and contamination, such as the introduction of dust, oil, or metallic particles between the braking surfaces. The devices of the second group do not ordinarily produce a constant braking force, and leakage of fluids is always a possibility to be contended with. Consequently, where a braking system requires a reliable, substantially constant braking force, the braking devices of the first and second groups are unacceptable. Many of the existing devices of the third group provide a constant braking force, but none are practical for uses which demand extreme reliability, economy, or precise repeatability of the braking force, for reasons cited below.

The automotive industry has long recognized the need for increased collision or impact protection for automobile drivers and passengers. However, a reliable, reusable (if refitted with an expendable, low-cost material), compact, and inexpensive kinetic-energy-absorbing device suitable for such use in automobiles is not available.

Helicopters, especially military helicopters, are experiencing damages to their supporting structures during fast, high-impact landings (usually necessitated by emergency or combat conditions). The supporting-structure damage, usually in the form of buckling, often prevents the helicopter from taking off again. This inability to take off is generally caused by the axis of rotation of the main rotor blades being at such an angle with the landing surface that the blades cannot rotate without striking the ground.

The aerospace industry is additionally concerned with obtaining a kinetic-energy-absorbing device which is not only extremely reliable, but one which further provides a precisely repeatable, substantially constant braking force. Such a braking device is essential for such tasks as braking and stopping linearly moving, delicate equipment that must be functionally tested while in a zero-gravity condition, such as occurs during a free fall. After the functional test or checkout has been completed, the delicate, tested article must be braked and stopped without incurring damage and without having imposed on it excessive "G" loads. When a plurality of substantially identical units of delicate equipment (such as, for example, missile subassemblies) must be functionally tested while freely falling, the braking forces for stopping the units of equipment must be substantially identical to each other in order that the life of each of the components of such equipment may be better estimated, the reliability of each of the equipment-components may be more precisely determined, etc.

One type of existing energy-absorber from the above-described third group utilizes a plurality of tubular columns to support and space the object to be braked from a base-plate. Each of the ends of the tubular columns opposite to the ones connected to the object to be braked is slidably connected to the base-plate and confronts a set of cutters fixedly attached to the base-plate. Each set of cutters longitudinally shears a respective one of the columns into several strips and concurrently deforms or curls those strips into rolls when the object and tubular columns move relative to and toward the base-plate and the cutters. One major disadvantage of this type of energy-absorber is that the object to be braked is supported by the very elements (tubular columns) on which the work must be done by the cutters to absorb the kinetic energy, and excessive loading of the tubular columns may cause the columns to buckle before the energy-absorption function of the energy-absorber has been performed or completed. Ordinarily, strict length-to-diameter ratios of the tubular columns of this type of device must be observed to prevent such occurrence. Unanticipated loads, therefore, could cause a catastrophic failure of the kinetic-energy-absorbing device. Another disadvantage of this type of energy-absorber is that the above-mentioned columns tend to twist about their longitudinal axes, and twisting of the columns presents an unknown factor into the predictability or repeatability of the braking or absorbing force.

Another type of energy or shock absorber from the third group is one wherein tubular columns are merely flattened and curled as the end of the tubular columns opposite to the one connected to the object to be braked are forced by the kinetic energy of the object through a pair of rollers and into contact with a camming member. Here again, the column-buckling problem presents itself, and buckling of the tubular columns could prevent further functioning of the energy absorber, thus resulting in damage to the object to be braked.

Still another, existing type of kinetic-energy-dissipating device from the third group involves the use of frangible, tubular columns. In this type, the ends of the tubular columns opposite to the ones connected to the object to be braked are forced into a mandrel-type of die when the object and columns move relative to the die, and the ends of the columns which contact the die then break into a plurality of fragments. The fragmentation of the column progressively continues along the column from the column end contacting the die and toward the column end connected to the object until the object is braked and stopped or until the entire column is consumed or fragmented. In addition to having most of the shortcomings of the other existing, energy-absorbing devices, this type of device has a further disadvantage; namely, a personnel hazard from flying fragments and an area-contamination problem which accompanies the fragmentation of the columns and leaves the immediate area around the object littered with debris.

It is apparent from the foregoing that there is not an existing kinetic-energy-absorbing device that fulfills the stringent requirements of extreme reliability and precise repeatability for braking delicate, linearly moving objects (such as, for example, an instrumented missile-section) and that is also versatile enough to be economically feasible for commercial use as an impact absorber on, for example, automobiles or helicopters.

It is, accordingly, a major object of the present invention to provide a new and improved kinetic-energy-absorbing device for braking a linearly moving object with a substantially constant braking force.

Another object of the present invention is to provide a kinetic-energy-dissipating device that performs work on a low-cost, expendable material incorporated therein to produce a constant braking force which is precisely repeatable, if the expendable material is replaced after each use.

A further object is to provide a highly reliable braking device for braking a linearly moving object, which device eliminates the need of closely controlled tolerances for its elongated, load-bearing structures to prevent buckling thereof during braking operations.

Yet another object is to provide a kinetic-energy-dissipating device substantially devoid of personnel hazards, which device is reusable with the replacement of a low-cost, expendable material incorporated therein.

A still further object is to provide a highly reliable kinetic-energy absorber for impact protection of drivers and passengers of commercial vehicles in case of accidents, which energy absorber is simply and easily readied for reuse by the replacement of a low-cost, expendable material, should it be used.

Still another object is to provide a kinetic-energy-dissipating device which utilizes a low-cost, expendable material for each use-cycle, thereby providing a device having a low cost per use.

Other objects and advantages will be evident from the specification and claims and the accompanying drawing illustrative of the invention.

Figure 1:
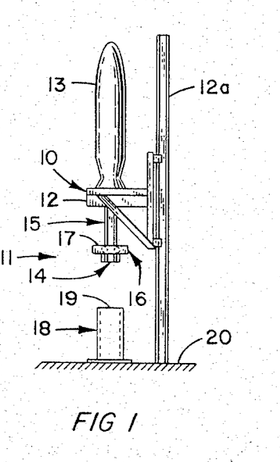
FIG. 1 is a schematic diagram of a test-rig having a linearly and vertically movable platform that is carrying a delicate missile section, which platform has associated therewith the present invention.

With reference to FIG. 1, a schematic diagram of a linearly movable object 10 to be braked having a kinetic energy dissipating or braking device 11 associated therewith is shown, wherein the object is, for example, a vertically moving platform 12 carrying a delicate missile section 13. The kinetic energy dissipating device 11 comprises an elongated probe 14 connected to the bottom of the platform 12, a strip of sheet material 15 fixedly mounted on each of two oppositely facing sides of the probe, a first structure 16 slidably mounted on the probe and in the vicinity of the probe end opposite to the one connected to the platform for holding and positioning at least one shearing member 17, and a second structure 18 having an open end 19 which is fixed relative to a reference plane 20. The probe 14 is parallel with the longitudinal axis of the probe and perpendicular to the reference plane 20. The open end 19 of the second structure 18 is aligned with and perpendicular to the probe 14, parallel with and spaced from the reference plane 20, and sized to permit entry of the probe and to engage and prevent entry of the first structure 16 when the platform 12 moves toward the reference plane. The resulting relative movement of the first structure 16 with respect to the probe 14 is accompanied by shearing of the strip of sheet material 15 by the first structure shearing member 17 and braking of the platform 12 and missile section 13 carried thereby.

Figure 2:
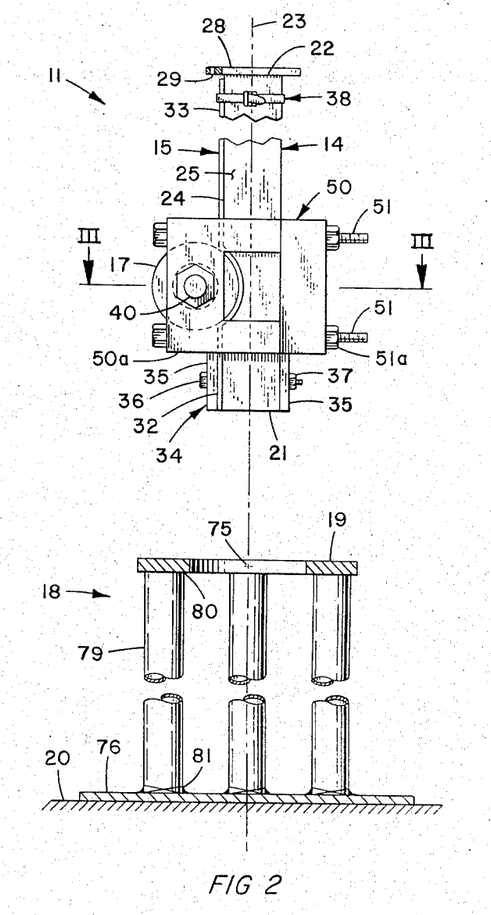
FIG. 2 is a side elevational, partially sectional view of the present invention.
Figure 3:
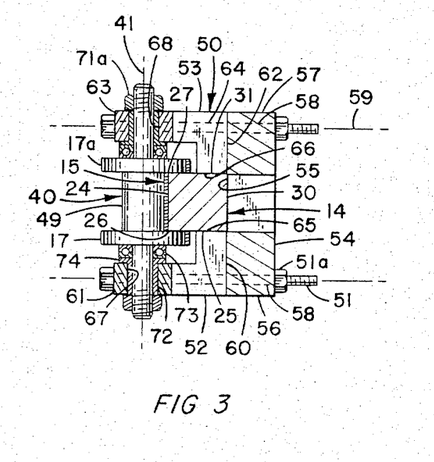
FIG. 3 is a partial, cross-sectional view taken along the line III—III in FIG. 2 and showing the second position of the shearing members with respect to the probe.
Figure 12:
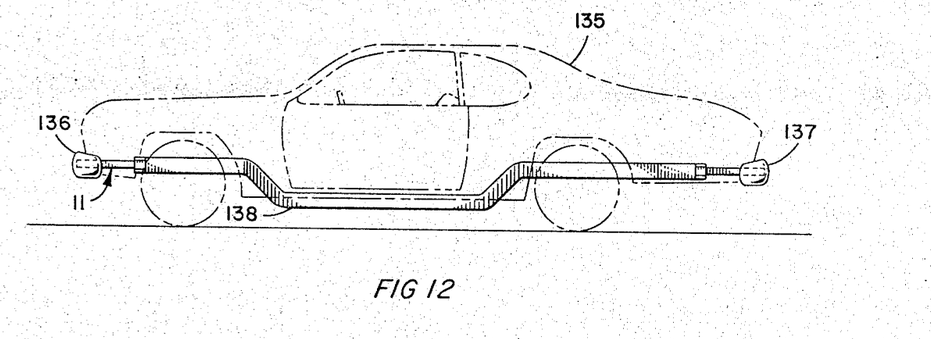
FIG. 12 is a schematic diagram of an automobile, shown in phantom line, having a frame and bumpers and incorporating a modification of the device of FIG. 8.

Referring now to FIGS. 2 and 3, the kinetic energy dissipating or absorbing device 11 comprises an elongated probe 14 having a first or distal end 21 and a second or proximal end 22, a longitudinal axis 23, a first surface portion 24 parallel to the probe axis, and a second surface portion 25 also parallel to the probe axis, but perpendicular to and interconnecting with the first surface portion. The probe first and second surface portions 24, 25 have substantial extensions along the probe axis 23, and the interconnection of the first and second surface portions form a cutting edge 26 (FIG. 3). The probe second or proximal end 22 is provided with means for removably mounting the probe 14 on an object to be braked (not shown) such as, for example, a test-rig platform 12 (FIG. 1) or an automobile bumper 136 (FIG. 12). A typical means for mounting the probe 14 (FIGS. 2,3) is the provision of a flange 28 having bolt holes 29, whereby the probe may be bolted to the object to be braked.

The probe 14 has a rectangular cross-sectional shape, and the above-mentioned probe first and second surface portions 24, 25 are two connected sides of the probe. Third and fourth surface portions 30, 31 are the remaining sides of the probe 14. The third and fourth surface portions 30, 31 are parallel to and extend along the probe axis 23. The probe third surface portion 30 is thus perpendicular to the probe second and fourth surface portions 25, 31. The interconnection of the first surface portion 24 with the fourth surface portion 31 defines another probe cutting edge 27.

A strip of sheet material 15 having two opposite end portions 32, 33 is positioned on at least one surface portion of the probe 14. The strip 15 is shown positioned on and in contact with the probe first surface portion 24. The strip of sheet material 15 extends along substantially the entire length of the probe first surface portion 24 and is wide enough to extend beyond and overhang both probe cutting edges 26, 27, better shown in FIG. 5.

Means 34 (FIGS. 2, 3) for holding the strip of sheet material 15 on the probe 14 in its above-described position and against motion along the probe longitudinal axis 23 comprises, for example, a pair of plates 35. The plates 35 are removably mounted on the probe 14 and in the following manner. One of the plates 35 is positioned on and in contact with the strip end portion 32 at the probe first or distal end 21, this plate being parallel to and spaced from the probe first surface portion 24 by the thickness of the strip 15, and the other plate 35 is positioned on and in contact with the probe third surface portion 30. The pair of plates 35 is held in position by at least one bolt 36 and associated nut 37, which bolt extends through the plates, the probe 14, and the strip of sheet material 15. The other end of the strip is held in contact with the probe first surface portion 24 by, for example, a belt and buckle 38, for relatively little load is imposed upon the end of the strip in the vicinity of the probe second or proximal end 22 and the only requirement is to prevent the strip from falling or peeling away from the probe first surface portion.

Figure 4:
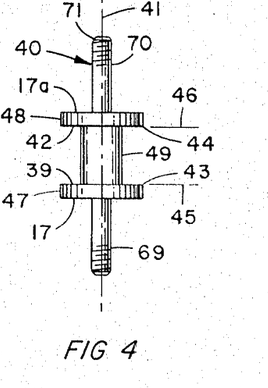
FIG. 4 is a view of the shaft and shearing members of FIG. 3.

The kinetic energy absorbing device 11 has at least one shearing member 17. Referring additionally to FIG. 4, the device 11 shows two shearing members in the form of rollers 17, 17a which are formed or fixedly mounted on a generally cylindrical shaft 40 having an axis 41. The shearing members or rollers 17, 17a have axes of rotation which are coincident with each other and coaxial with the shaft axis 41. Each roller 17 or 17a has a side face 39 or 42 and a circular cutting edge 43 or 44 which lies in a plane 45 or 46; each plane is perpendicular to the shaft axis 41. The roller side faces 39, 42 are mutually spaced from and confront each other. The shaft axis 41 is perpendicular to the probe axis 23 and parallel to the probe first surface portion 24. Each roller 17 or 17a has a cylindrical outer surface 47 or 48 which intersects its corresponding side face 39 or 42 to form the above-mentioned cutting edges 43 or 44. A portion of one roller side face 39 or 42 confronts a respective one of the probe second or fourth surface portions 25 or 31 and a portion of the other roller side face confronts the other of the probe second or fourth surface portions. The shaft has a middle portion 49 (i.e., that portion between the shaft rollers 17 or 17a) which has a larger diameter than the diameter of the remainder of the shaft 40 and is in rolling contact with that portion of the strip of sheet material 15 which is between the shearing member side faces 39, 42 when the shearing members are in their second position (discussed below). The shearing members or rollers 17 or 17a are rotatably movable relative to the probe 14, as more fully explained later.

Means 50 for holding the shearing members 17, 17a on the probe 14 in the vicinity of the probe first end 21 and for positioning the shearing members relative to the probe surface portions 24, 25, 30, 31 comprises supporting frame members 50 rigidly held together and in sliding contact with the probe surface portions by fastening means 51, as is described below. The supporting frame members 50 are initially mounted near the probe first or distal end 21 and each has a surface 50A (FIG. 2) in contact with at least one of the strip holding means plates 35. The supporting frame members 50 are spaced from the probe first end 21 by the strip holding plates 35, which thus prevent the supporting frame members from inadvertently separating or falling from the probe 14. The supporting frame members 50 are movable along the probe 14 in a direction extending away from the probe first end 21 (and the strip holding plates 35) and toward the probe second end 22.

Figures 5, 6, 7:
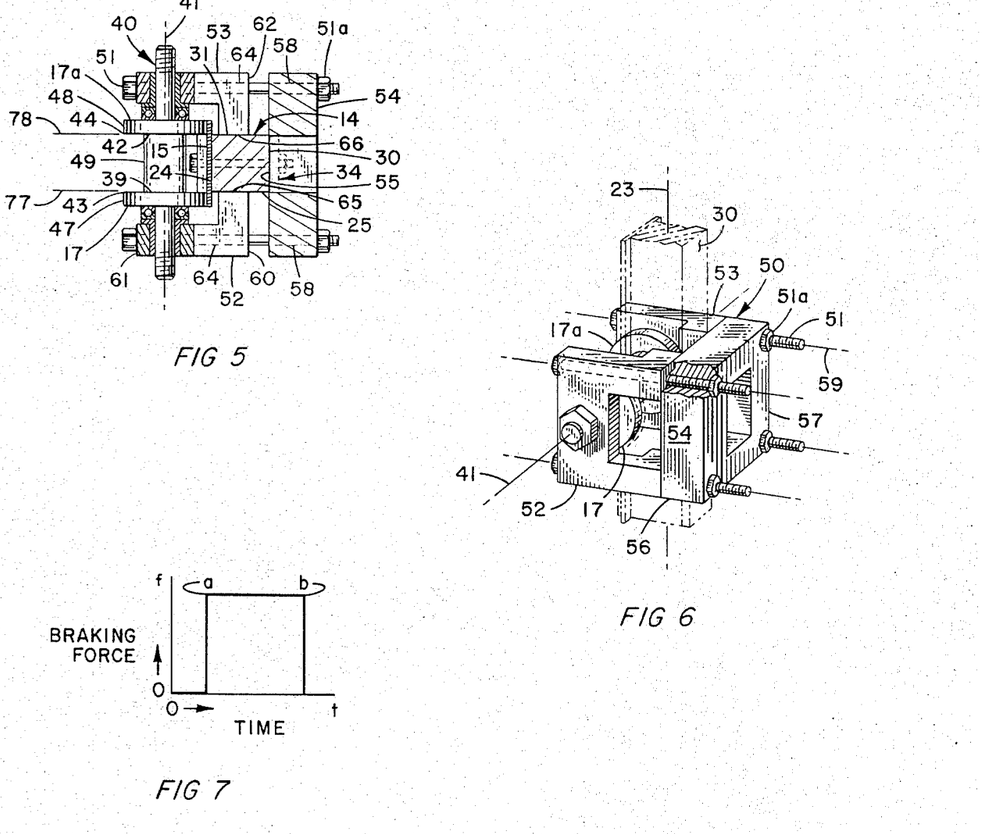
FIG. 5 is a partial, cross-sectional view similar to FIG. 3, except that the shearing members are in their first position with respect to the probe.
FIG. 6 is a partial, perspective view of the shearing members and the means for holding and positioning the shearing members on the probe, the probe and strip of sheet material being shown in phantom line.
FIG. 7 is a graphical representation of the braking force versus time during operation of the subject invention.

Referring to FIGS. 3 and 6, the supporting frame members 50 comprise two wall frames 52, 53 and a base frame 54. The base frame 54 has a face 55 (FIG. 3) in sliding contact with the probe third surface portion 30 and two opposite end portions 56, 57 which extend beyond the probe third surface portion in a direction perpendicular to the probe axis 23. The base frame end portions 56, 57 each contain two apertures 58. The base frame apertures 58 (FIG. 3) have axes 59 parallel to the probe second and fourth surface portions 25, 31.

In FIG. 3, the two wall frames 52, 53 each have two opposite ends 60, 61 and 62, 63, respectively, and two longitudinal, parallel passageways 64 therethrough. The wall frame passageways 64 open through the opposite ends of their respective wall frame 52 or 53. Each wall frame 52 or 53 is mounted on a respective one of the base frame end portions 56, 57 with one of the wall frame ends 60 or 62 in contact with the base frame end portion associated therewith. The passageways 64 of one wall frame 52 or 53 are in register and aligned with the apertures 58 in one end portion of the base frame 54, and the passageways of the other wall frame are in register and aligned with the apertures of the other end portion of the base frame. Each wall frame 52 or 53 has a face 65 or 66, and the wall frame faces mutually face each other. A portion of one of the wall frame faces 65 or 66, is in sliding contact with a respective one of the probe second and fourth surface portions 25, 31, and a portion of the face of the other wall frame is in sliding contact with the other of the probe second and fourth surface portions. A portion of each of the wall frame faces 65, 66 is cut away to provide clearance for the shearing members 17, 17a. The wall frames 52, 53 each have an aperture 67 or 68, which apertures are in mutual alignment, for mounting the above-mentioned shaft 40 which has the shearing members or rollers 17, 17a formed thereon. The wall frame apertures 67, 68 are provided in the wall frame ends 61, 63 which are opposite the wall frame ends 60, 62 in contact with the base frame 54. The wall frame apertures 67, 68 have axes 41 which are perpendicular to the probe axis 23, parallel to the probe first surface portion 24, and coaxial with each other. The shaft 40 has end portions 69, 70 (FIG. 4) which extend through the wall frame apertures 67, 68 and are provided with means 71 for removably securing the shaft in the wall frame apertures, such means being shown in FIGS. 3 and 4 as threads 71 for receiving nuts 71a. The shaft 40 is mounted for rotation with respect to the wall frames 52, 53 by the use of bushings 72 (FIG. 3) and ball thrust-bearings 73. The bushings 72 each have a flange 74 formed on one end and an axis 41. The bushings 72 are mounted in the wall frame apertures 67, 68 with the bushing flanges 74 facing each other. The ball thrust-bearings 73 are mounted on opposite ends of shaft 40 and between the bushing flanges 74 and the shearing members 17, 17a.

The above-mentioned fastening means 51 for rigidly holding the base frame 54 and wall frames 52, 53 together comprises a plurality of elongated bolts 51 and nuts 51a. Each of the bolts 51 extends through a one of the wall frame passageways 64 and a one of the base frame apertures 58 aligned therewith and is provided with a respective one of the nuts 51a. Before the nuts 51a are tightened, the rollers 17, 17a are in a first position, as shown in FIG. 5, wherein the rollers are laterally spaced from the probe first surface portion 24 and in contact with that portion of the strip of sheet material 15 which extends beyond and overhangs the probe first surface. In this first position of the rollers or shearing members 17, 17a, the shearing member side faces 39, 42 are adjacent planes 77, 78 containing the probe second and fourth surface portions 25, 31. When the nuts 51a are tightened, the shearing members 17, 17a move to a second position, as shown in FIG. 3, wherein the shaft middle portion 49 is in rolling contact with the strip of sheet material 15 and portions of the shearing member side faces 39, 42 are adjacent their corresponding probe second or fourth surface portions 25, 31. When shearing members 17, 17a are in the second position, the portions of the shearing member side faces 39, 42 which are adjacent respective probe second and fourth surface portions 25, 31 each extend along their respective probe second and fourth surface portions in a direction perpendicular to the probe first surface portion 24 or respective cutting edge 26 or 27 and for a distance of at least the thickness of the strip 15 in order to assure the shearing of the strip by the shearing members. Further, the probe cutting edges 26, 27 are in contact with a corresponding one of the shearing member cutting edges 43 or 44 when the shearing members 17, 17a are in their second position.

Referring back to FIG. 2, a structure 18 (the second structure in FIG. 1) having an open end 19 is shown. The structure open end 19 has a center 75 and is positioned between the probe first end 21 and a reference plane 20 which is perpendicular to the probe axis 23. The structure 18 is fixed relative to the reference plane 20. The center 75 of the structure open end 19 is aligned with the probe longitudinal axis 23. The size of the structure open end 19 is larger than the combined cross-sectional dimensions of the probe 14 and the strip-holding plates 35 which are mounted in the vicinity thereof, but smaller than the outisde dimensions of the supporting frame members 50.

The structure 18 of FIG. 2 comprises a base plate 76, a ring-shaped member 19 which includes the structure open end 19, and a plurality of tubular columns 79 having two opposite ends 80, 81. One end 81 of the tubular columns 79 is fixedly attached to the base plate 76 and the other end 80 is attached to the ring-shaped member 19. Thus, with the base plate 76 lying in contact with the reference or floor 20, the ring-shaped member 19 is spaced above the reference plane and base plate. The ring-shaped member 19 is parallel to the reference plane 20, and the tubular columns 79 have a length at least equal to the length of the probe 14. Note that the tubular columns 79 could be readily replaced by a hollow, cylindrical element such as a pipe (not shown in FIG. 2).

In operation, the supporting frame members 50 are slidably mounted on the probe 14 in the vicinity of the probe first end 21 and in contact with at least one of the strip holding plates 35. In order to mount the supporting frame members 50 on the probe 14, the wall frames 52, 53, the shaft 40 with shearing members 17, 17a, and bolts 51 are first positioned on the probe with the shearing members in the above-described first position (FIG. 5). Next, the base frame 54 is positioned on the bolts 51, and then the nuts 51a are installed on the bolts. Each nut 51a is alternately screwed down a few turns at a time until the base frame 54 is brought into contact with the wall frames 52, 53. The tightening of the nuts 51a moves the shearing members 17, 17a from their first to their second position (described above) wherein the shearing member cutting edges 43, 44 cooperate with the probe cutting edges 26, 27 and shear and locally deform around the shearing members that portion of the strip of sheet material 15 which extends beyond and overhangs the probe first surface portion 24. While the base frame 54 rests against one of the strip holding plates 35, the supporting frame members 50 are prevented from falling from the probe 14.

The kinetic energy absorbing device 11 is now ready for braking the object 10 (FIG. 1). The object 10 is placed into linear movement such as, for example, permitting the object to freely fall under the influence of gravity toward the reference plane 20. When the probe first end 21 initially enters the structure open end or ring-shaped member 19, the supporting frame members 50 concurrently come into contact with the ring-shaped member. Because the outside dimensions of the supporting frame members 50 are larger than the internal diameter of the ring-shaped member 19, there is an interference between the ring-shaped member and the supporting frame members. Thus, the probe 14, the strip of sheet material 15, and the strip holding means 34 continue to move through the ring-shaped member 19 in a direction toward the reference plane 20, while the supporting frame members 50 are stopped. As a consequence, the supporting frame members 50 are moved along the probe 14 in a direction from the vicinity of the probe first end 21 toward the probe second end 22. The resulting movement of the supporting frame members 50 with respect to the probe 14 is accompanied by the shearing of the strip of sheet material 15 by the shearing members 17, 17a in cooperation with the probe cutting edges 26, 27 and the concurrent braking of the object 10. As can readily be seen in FIG. 2, there is some deforming, as well as shearing, of the strip 15 by the shearing members 17, 17a, and the energy dissipation resulting from the deforming of the strip during the concurrent shearing thereof by the shearing members reduces the quantity of shearing members 17, 17a and cooperating probe cutting edges 26, 27 required by the device 11 to brake and stop the linearly moving object 10, not shown in FIG. 2.

The total amount of kinetic energy absorbed and the amount of kinetic energy absorbed per unit of probe length can be closely controlled by the selection of suitable types and thicknesses of the sheet material 15 to be sheared. The device 11 is particularly useful in controlling "G" levels during braking of the linearly moving object 10, for the kinetic energy dissipating or braking force is essentially constant and independent of velocity of the object to be braked. FIG. 7 shows a graphical representation of the braking force versus time during operation of the subject invention 11. There is substantially no braking force applied to the object to be braked until the braking force generated by the device 11 reaches a magnitude large enough to initiate shearing of the strips of sheet material 15 (point a). The braking force of the kinetic energy absorbing device 11, once shearing of the strips 15 begins, remains substantially constant until the kinetic energy of the object 10 to be braked has been reduced to a level wherein the braking force is not large enough to enable continued shearing of the strip by the shearing members 17, 17a (point b). Consequently, the subject invention 11 can be readily used for braking delicate, linearly moving instrumentation without exceeding design stress or shock loads. It is important to note that when the shearing members 17, 17a are in their above-described second position (shown in FIG. 3), the strip of sheet material 15 has been initially sheared by the shearing members. Thus, the resistance by the strip 15 to continued shearing by the shearing members 17, 17a is substantially constant, for the momentarily higher resistance to the initiation of the shearing of the strip has already been accomplished.

From the foregoing description of the kinetic energy dissipating device 11, it is clear that the device eliminates the need of closely controlled tolerances for its elongated, load-bearing structure (probe) 14 to prevent buckling thereof during braking operations. The kinetic energy of the object to be braked is dissipated by the conversion of the kinetic energy into work performed on the strip of sheet material 15 attached to the probe 14 rather than by work performed on the probe itself. The strip 15 does not have to withstand buckling loads because the probe 14 is designed to take the column and buckling loads. Since the probe 14 does not have to be malleable or ductile (as it would necessarily have to be, if it were to be sheared or deformed), the probe may be constructed of a hard, high-strength steel and may be designed with a large safety factor against buckling.

The strip of sheet material 15 is a low-cost, expendable material and the force for shearing and deforming the strip is substantially constant. Thus, if the used strip 15 is replaced by a similar strip after each braking cycle, the present invention will produce a substantially constant braking force which is precisely repeatable. Additionally, the kinetic energy dissipating device 11 provides a device having a low cost per use because it utilizes a low-cost, expendable material 15.

Figure 3A:
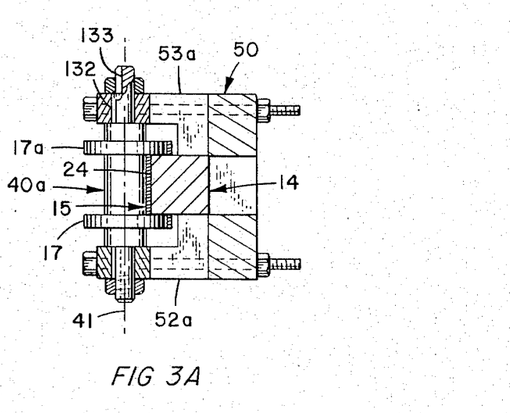
FIG. 3A is a partial, cross-sectional view of a modification of the device of FIG. 2 similar to FIG. 3.

A modification of the device of FIG. 2 is shown in FIG. 3A. The device of FIG. 3A differs from the device of FIG. 2 only by the manner in which their respective shafts 40a and 40 are mounted in their wall frames 52a, 53a and 52, 53. The shaft 40a of the device of FIG. 3A is fixed relative to the wall frames 52a, 53a (rather than mounted for rotation relative thereto) and is in sliding contact rather than rolling contact with that portion of the strip of sheet material 15 which lies in contact with the probe first surface portion 24. The ball-thrust bearings 73 and the bushing 72 utilized in the device of FIG. 2 are, of course, not required by the device of FIG. 3A. As in the device of FIG. 2, the shearing members 17, 17a of the device of FIG. 3A are formed on or fixed relative to the shaft 40a.

In the device of FIG. 3A, the shaft 40a is prevented from rotation relative to the wall frames 52a, 53a by the use of, for example, keys 132 positioned in keyways 133 formed in the ends of the shaft and in the apertures of the wall frames wherein the shaft is mounted.

In operation, the device of FIG. 3A operates in a manner similar to the device of FIG. 2, except that the shaft 40a and shearing members 17, 17a slide rather than roll relative to the probe 14 and strip of sheet material 15 when the means 50 for holding and positioning the shearing members moves relative to the probe.

Figure 8:
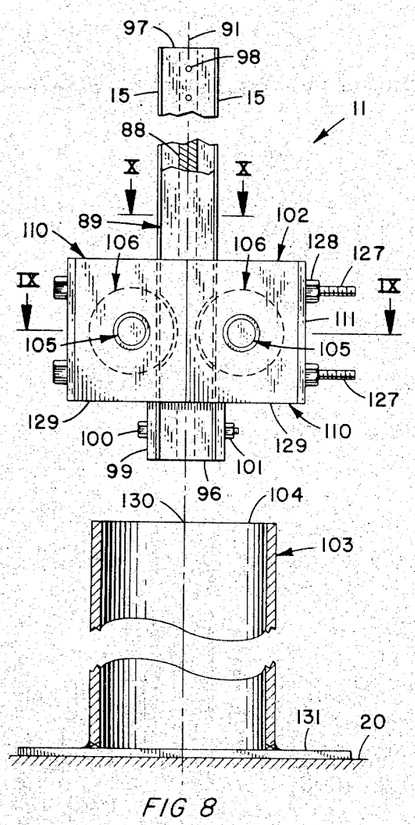
FIG. 8 is a side elevational, partially sectional view of a modification of the device of FIG. 2.
Figure 10:
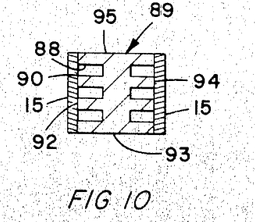
FIG. 10 is a cross-sectional view taken along the line X—X in FIG. 8 and showing the probe grooves covered by the strips of sheet material.

A modification of the present invention is shown in FIGS. 8 and 10, which illustrate the use of square-edged grooves 88 in the probe 89 to form cutting edges 90 rather than the previously described probe of FIG. 2 which utilizes interconnecting surface portions of the probe 14 to form the cutting edges 26, 27.

As previously stated in connection with FIG. 1, a typical object 10 to be braked is, for example, a test-rig of the type having parallel guide rails 12a (only one guide rail shown) which are perpendicular and fixedly mounted with respect to a reference plane 20 and further having a movable platform 12 parallel with the reference plane and slidably mounted on the guide rails for movement therealong. The braking device 11 provides a means for dissipating kinetic energy of the platform 12 and any item or object 10 carried thereby (such as a delicate missile section 13) with a relatively constant absorbing force for braking the platform and item. Referring again to FIG. 8, the kinetic energy dissipating means 11 comprises an elongated probe 89 having a longitudinal axis 91, a generally rectangular cross-sectional shape (FIG. 10), four flat, elongated surfaces 92, 93, 94, 95 parallel with the probe axis which define the sides of the probe, a distal end 96, and a proximal end 97. Two oppositely facing and parallel surfaces of the probe 89 each have formed therein a plurality of square-edged grooves 88. The grooves 88 have extension along at least a major portion of the probe's length and are parallel with the probe axis 91. The proximal end 97 of the probe 89 is provided with means for removably mounting the probe on and perpendicular to the bottom of the platform (not shown in FIG. 8), the mounting means being in the form of bolt holes 98.

A strip of sheet material 15 is positioned on each probe surface 92, 94 having the grooves 88. The sheet material strips 15 extend along and in contact with the probe surfaces 92, 94 containing the grooves 88, and each strip has a width great enough to cover completely every groove on that particular surface. For convenience, the sheet material strips 15 have the same width as their corresponding probe surfaces 92, 94. The strip of sheet material 15, whether used on the device of FIG. 2 or FIG. 8, is preferably a medium carbon, high manganese steel (Government Specification QQ-S-781, type 1).

Figure 10A:
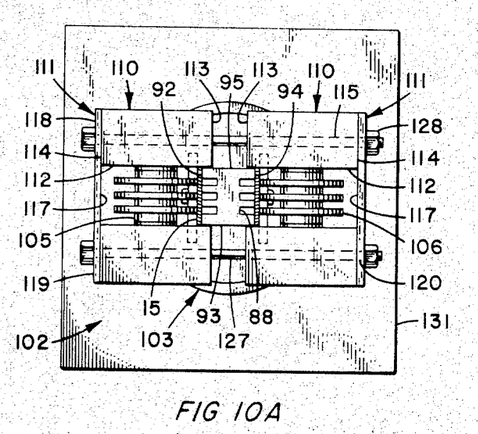
FIG. 10A is a plan view of the device of FIG. 8, but showing the shearing members in their first position with respect to the probe.

A means 99 for holding the sheet material strips 15 on the probe 89 in their above-said positions and against motion along the probe axis 91 is provided, which holding means comprises a pair of plates 99 removably mounted on the probe surfaces 92, 94 containing the grooves 88 and at the probe distal end 96. The plates 99 are held in position by at least one bolt 100 and associated nut 101, which bolt extends through the plates 99, the strips 15, and the probe 89 in the vicinity of the probe distal end 96. The strip holding plates 99 laterally extend beyond the probe surfaces 92, 94 on which the plates are mounted. The extensions of the strip holding plates 99, shown in FIG. 10A, are for providing interference for the first structure 102, described later, when the first structure moves toward the probe distal end 96. The cross-sectional or outside dimensions of the plates 99, bolt 100 and nut 101, and probe 89 are smaller than the internal dimensions of the second structure open end 104, also discussed later.

Figure 9:
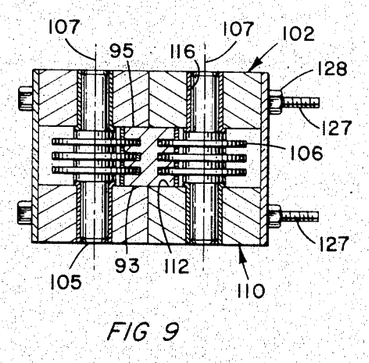
FIG. 9 is a partial, cross-sectional view taken along the line IX—IX in FIG. 8 and showing the second position of the shearing members with respect to the probe.
Figure 11:
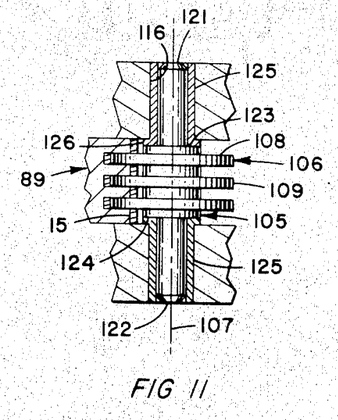
FIG. 11 is an enlarged, partial view of the device of FIG. 9 and showing one of the shearing members rotatably mounted in the blocks of the first structure.

Referring additionally to FIGS. 9 and 11, a first structure 102 has an interior volume and contains two shafts 105, each shaft having a plurality of circular flanges or cylindrical rollers 106 formed thereon. The first structure 102 is removably and longitudinally slidably mounted on the probe 89 in the vicinity of the probe distal end 96 and over the strips of sheet material 15 covering the probe grooves 88. The first structure 102 is in contact with and spaced from the probe distal end 96 by the above-described strip holding means 99. The shafts 105 are rotatably mounted in the first structure 102 and have axes of rotation perpendicular to the probe axis 91 and parallel to the probe surfaces 92, 94 having the grooves 88. A plurality of circular flanges or cylindrical rollers 106 is formed or rigidly mounted on each shaft 105, and the rollers of each shaft have axes 107 coaxial with their corresponding shaft. The rollers 106 further have flat sides 108 and cylindrical, peripheral faces 109. The circular flanges of one shaft 105 have peripheral face widths less than and extend into their corresponding probe grooves 88 of one of the probe surfaces 92 or 94, and the circular flanges of the other shaft have peripheral face widths less than and extend into the probe grooves of the other probe surface. Since the strips of sheet material 15 cover the probe grooves 88, the flange or roller peripheral faces 109 in cooperation with the cutting edges 90 formed by the interconnections of the probe grooves with the probe surfaces 92, 94 containing those grooves shear and locally deform those portions of the strips in contact with the portions of the flange or roller faces which extend into the respective grooves. The circular flange faces 109 are spaced from the bottom of the probe grooves 88 by the thickness of the strips of sheet material 15. The diameter of the flanges or rollers 106 are uniform and are large enough to provide clearance between the shaft 105 and the strips 15 when the rollers extend into the grooves 88 through and in contact with strips. The rollers or flanges 106 are movable along the probe grooves 88 by the sliding of the first structure 102 along the probe 89.

A preferred embodiment of the first structure 102 (better shown by FIG. 10A) further comprises four substantially identical blocks 110 (which are grouped into two pairs) and two end plates 111. Each block 110 has a side face 112 two opposite end faces 113, 114, two parallel passageways 115 extending therethrough which penetrate the end faces and are parallel to the side face, and a circular aperture 116 (FIGS. 9 and 11) therethrough which is perpendicular to and penetrates the side face. The end plates 111 each have a side surface 117, first and second end portions 118, 119, and two holes 120 through each end portion. The holes 120 of each end plate are perpendicular to and penetrate their corresponding end plate side surfaces 117. The above-mentioned shafts 105 each have first and second end portions 121, 122. The end portions of each shaft 105 have a smaller diameter than the diameter of the remainder of the shafts. First and second shoulders 123, 124 are formed on each shaft 105 by the junctions of the reduced diameter end portions of that shaft with the remainder of that shaft. One of the shafts 105 is mounted in each pair of blocks 110, the first end portion 121 of one of the shafts is rotatably mounted in the aperture 116 of one of the members of that pair of blocks, and the shaft second end portion 122 is rotatably mounted in the aperture of the other member of that pair of blocks. The rotatable mounting of the shaft 105 is effected by the use, for example, of a pair of bushings 125. The bushings 125 each have a flange 126 on one end of the bushing and are mounted in the block apertures 116 with their flanges mutually confronting each other. One of the end faces of one of the members of one pair of blocks 110 is positioned on the end plate first end portion 118 and in contact with the end plate side surface 117. The block passageways 115 are in register and aligned with the end plate holes 120, and the other member of that pair of blocks is similarly positioned on the other end of that end plate. The other pair of blocks 110 is likewise positioned on its corresponding end plate 111 and in the same manner as the other pair of blocks. Elongated bolts 127 extend through the holes 120 in the first end portion of one of the end plates 111, the passageways 115 of one member of a pair of blocks 110, the passageways of one member of the other pair of blocks, and the holes in the first end portion of the other end plate. Another pair of elongated bolts 127 similarly extends through the other end portion of the end plates 111 and remaining members of the two pairs of blocks 110. Nuts 128 are installed on the bolts to secure the blocks 110 and end plates 111 in place on the probe 89.

FIG. 10A depicts the first structure 102 in its first position wherein the rollers 106 of one shaft 105 tangentially contact one of the strips of sheet material 15 and the rollers of the other shaft tangentially contact the other strip of sheet material. Accordingly, the rollers 106 are spaced above the probe surfaces 92, 94 containing the grooves 88 by the thickness of the strip 15. The plates 99 of the strip holding means extend laterally from the probe surfaces 92, 94 containing the grooves 88 in order to engage the blocks 110 of the first structure 102 and to prevent contact by the rollers 106 with the strip holding plates. While the first structure 102 is in its first position, the end faces of the members of one pair of blocks 110 opposite to the ones contacting the end plates 111 are spaced from and mutually confront the end faces of the members of the other pair of blocks opposite to end faces contacting the other end plate. The second position of the first structure 102 is obtained by screwing down the nuts 128 of the elongated bolts 127. Each nut 128 is alternately screwed a few turns to prevent the rollers 106 from coming out of register with their corresponding probe groove 88. As the nuts 128 are tightened, the cylindrical rollers or circular flanges 106 move into the grooves 88 and shear and locally deform that portion of the strip 15 in contact with the rollers in the manner previously described. Once the rollers 106 are spaced from the bottom of the groove 88 by the thickness of the strip 15, the mutually confronting end faces 113 of the pairs of blocks 110 are in contact with each other. FIG. 9 shows the first structure 102 in its second position, in which position the first structure is ready to coact with the probe 89 and second structure 103 (discussed later) to brake the linearly moving object (not shown in FIG. 8). As shown in FIGS. 9 and 10A, a portion of the block side faces 112 is parallel with and in contact with the probe surfaces 93, 95 without the probe grooves 88. Each block 110 further has a bottom surface 129 (FIG. 8) which interferes with the strip holding means 99 upon movement of the first structure 102 toward the probe distal end 96, whereby the means for holding the strips 15 also prevent the first structure from sliding off the probe 89.

The second structure 103, shown in FIGS. 8 and 10A, has an open end 104, which open end has a center 130 and is positioned between the distal end 96 of the probe 89 and the above-mentioned fixed reference plane 20 which is perpendicular to the probe axis 91. The second structure open end 104 is fixed relative to the reference plane 20. The center 130 of the second structure open end 104 is aligned with the probe axis 91. The size of the second structure open end 104 is larger than the cross-sectional dimension of the probe 89 and the strip holding means 99 and is smaller than the outside dimensions of the first structure 102, whereby the probe distal end 96 and strip holding means enter the second structure open end and the first structure which is attached thereto is prevented from entering the second structure open end when the object 10 (FIG. 1) to be braked is moved toward and along a path perpendicular to the reference plane 20. The resulting relative movement of the first structure 102 with respect to the probe 89 is accompanied by the shearing of the strip of sheet material 15 by the rollers 106 and the braking of the test-rig platform 12 (FIG. 1) and missile section 13 (FIG. 1) carried thereby. The second structure 103, as shown in FIG. 8, is conveniently made from a piece of pipe. The end opposite to the open end 104 is fixedly mounted on a plate 131, which plate rests on the reference plane 20.

In operation, the probe second end 97 is mounted on the object 10 (FIG. 1) to be braked which is, for example, the test-rig platform. The mounting of the probe 89 is effected by the use of bolts (not shown) which extend through the probe bolt holes 98 provided therefor. The second structure 103 is perpendicularly aligned with the probe axis 91. The strips of sheet material 15 are removably mounted on the probe 89 in the following manner. A strip of sheet material 15 is placed on each probe surface 92, 94 having grooves 88, and the strip holding means plates 99 are positioned over the strips at the probe distal end 96. At least one bolt 100 is extended through the holding means plates 99, the probe 89, and strips of sheet material 15 therebetween. The strip holding plate bolt 100 is locked into position by the nut 101. Since substantially all of the forces imposed on the strips 15 are absorbed by the strip holding plates 99 and bolt 100, the other ends of the strips may be held against the probe surfaces 92, 94 by any convenient means such as tape or wire (not shown). The first structure 102 is now positioned in its first position (described above) on the probe 89 in the vicinity of the probe distal end 96 and in a position resting against the strip holding plates 99 as depicted in FIG. 10A. The first structure nuts 128 are alternately tightened and the first structure 102 is brought into its above-described, second position. The braking device 11 is now ready for use. The object 10 (FIG. 1) to be braked (the platform 12 and missile section 13 carried thereon) is now allowed to move linearly in a direction toward and perpendicular to the reference plane 20. The probe distal end 96 enters the second structure open end 104 and concurrently the first structure 102 is contacted by the second structure open end and prevented from entering. As the kinetic energy of the platform 12 (FIG. 1) and missile section 13 carried thereby moves or continues to move the platform towards the reference plane 20, the first structure 102 is moved along the probe 89 and in a direction toward the probe proximal end 97. While the shearing members 106 roll in the grooves 88 of the probe 89, the strips of sheet material 15 are sheared and deformed around the shearing members or rollers 106 and the kinetic energy of the platform 12 and missile section 13 is absorbed. Before the probe 89 reaches the reference plane 20 and/or before the first structure 102 reaches the probe proximal end 97, the object 1o (FIG. 1) is substantially slowed or braked, if not stopped, thus preventing an excessive impact load or "G" load from being imposed on the object or item to be braked.

The kinetic energy dissipating device 11 is substantially devoid of personnel hazards. From the above-described operation, it is clear that the strip of sheet material 15 which is cut into strips remains on the probe 89 and that portion of the strip which is sheared must have passed through the second structure open end 104 into the second structure 103. Although the likelihood of flying chips or other debris from the sheared strips 15 is very remote, a shield (not shown) could readily be installed around the second structure 103. Since the device of FIG. 8 utilizes a solid pipe for a second structure 103, there is no need for a shield to protect operating personnel from the unlikely contingency of flying chips or particles.

Figure 13:
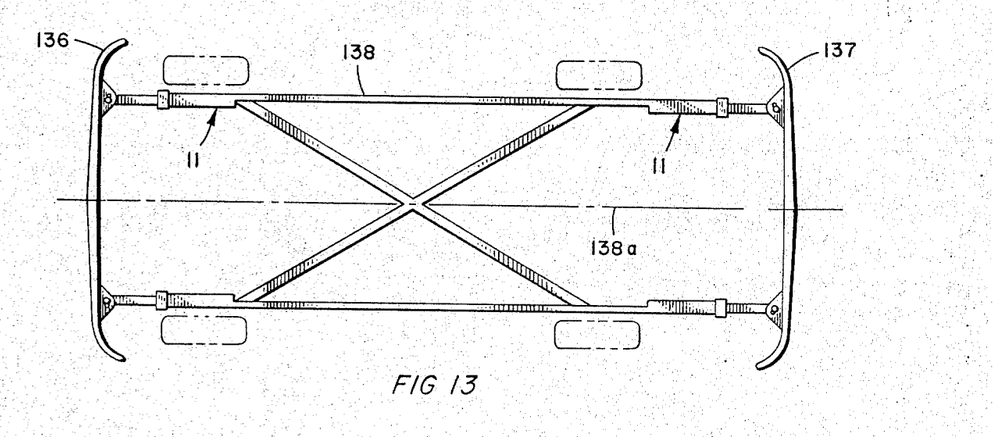
FIG. 13 is a plan view of an automobile frame with bumpers and showing the location of the subject invention with respect to the bumpers and frame.
Figure 14:
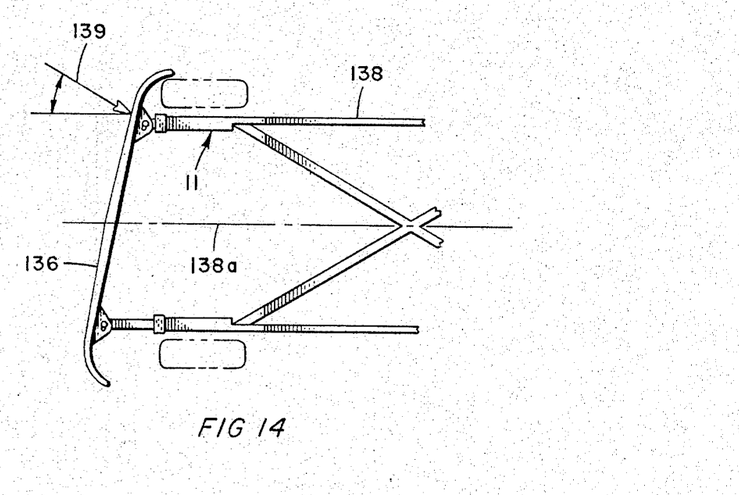
FIG. 14 is a partial, plan view of the automobile frame and bumper shown in FIG. 13, the bumper having received an impact which produces a force vector originating laterally of and at an angle to the longitudinal axis of the automobile.
Figure 15:
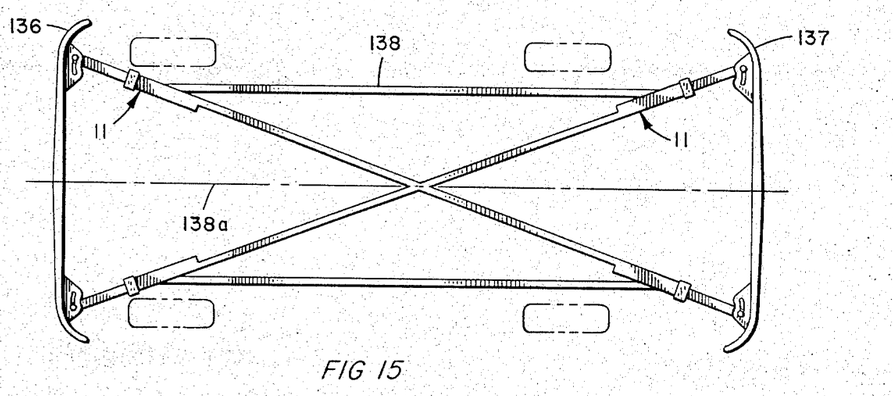
FIG. 15 is a plan view of another automobile frame with bumpers and showing the location of the subject invention with respect to the bumpers and frame.
Figure 16:
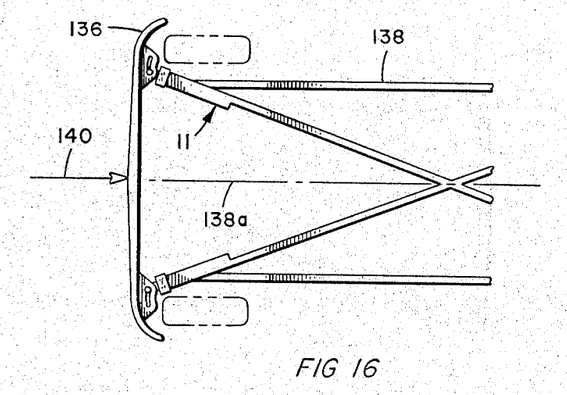
FIG. 16 is a partial, plan view of the automobile frame and bumper shown in FIG. 15, the bumper having received an impact which produces a force vector coincident with the automobile longitudinal axis.
Figure 17:
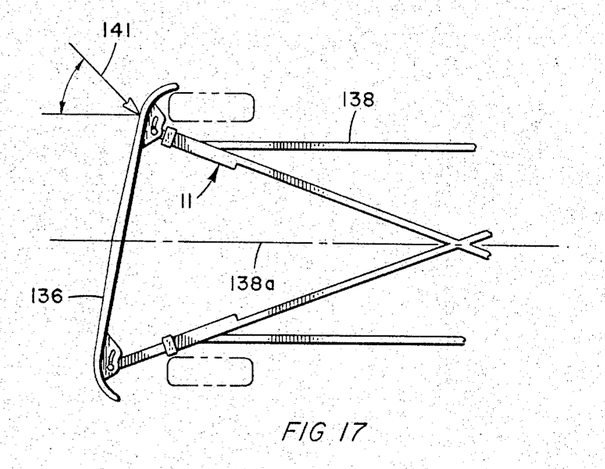
FIG. 17 is a partial, plan view of the automobile frame and bumper shown in FIG. 15, the bumper having received an impact which produces a force vector originating laterally of and at an angle to the longitudinal axis of the automobile.

In FIGS. 12 and 13, a further modification of the present invention is shown as a device 11 for absorbing kinetic energy of a linearly moving vehicle having a frame and at least one bumper. The device 11 is incorporated, for example, in an automobile 135 between the front and rear bumpers 136, 137 and the automobile frame 138. FIGS. 13 and 15 show, for example, two alternate ways in which the braking devices 11 may be positioned with respect to the longitudinal axis 138a of the automobile 135. In FIG. 13, the impact absorbing devices 11 are substantially parallel with automobile axis 138a, while the devices of FIG. 15 are at angles with the automobile axis. FIG. 14 shows the position of the front bumper 136 of FIG. 13 after a collision which produces a force or impact vector 139 on one side of the automobile front bumper and at an angle to the direction of travel of the automobile (not shown in FIG. 14). FIG. 16 shows the position of the front bumper 136 of FIG. 15 after a collision which produces a force vector 140 directly opposing the motion of the automobile (not shown in FIG. 16), and FIG. 17 shows the position of the bumper 136 of FIG. 15 after a collision which produces a force vector 141 on one side of the automobile front bumper.

Figures 18, 19, 20:
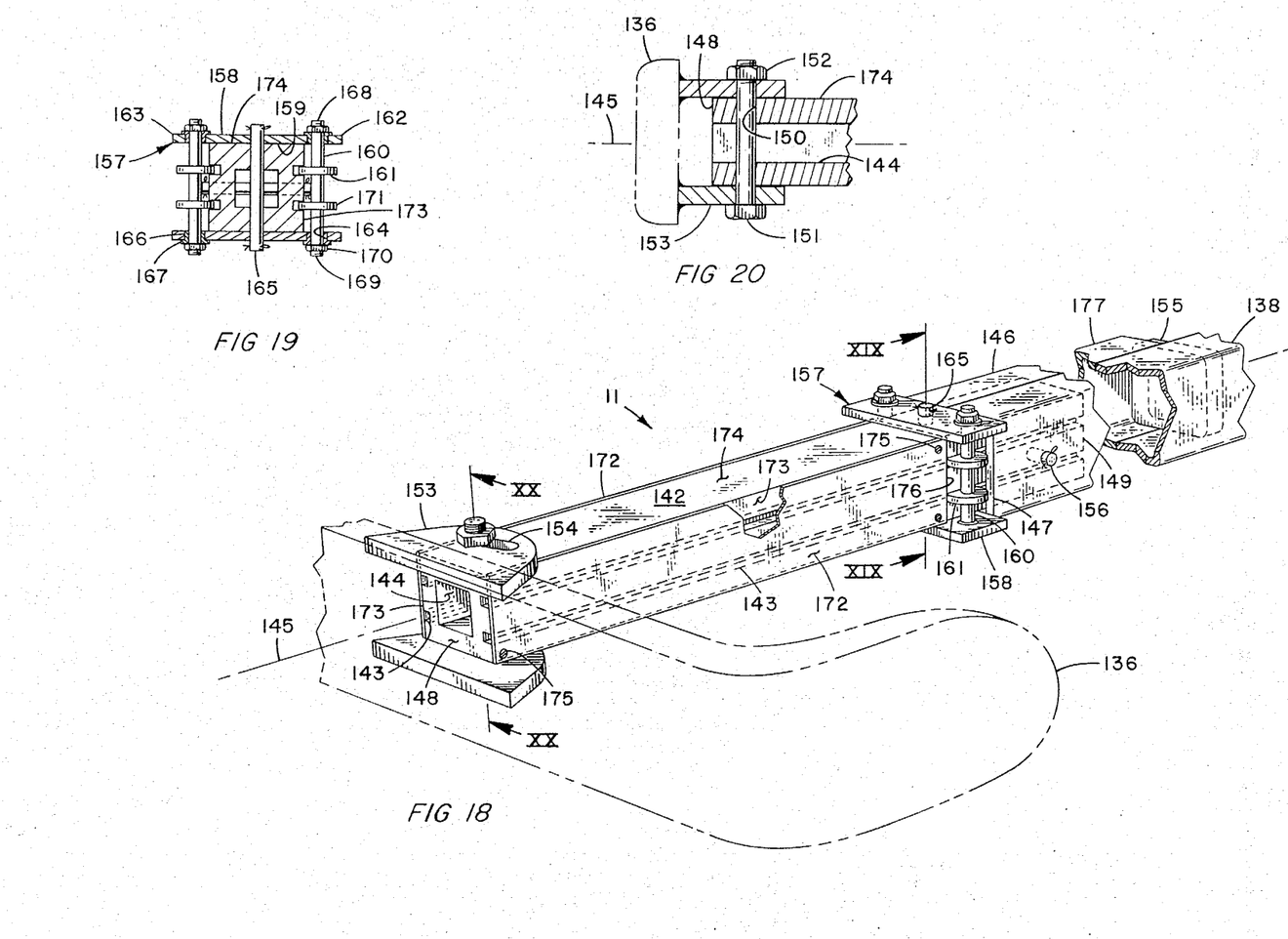
FIG. 18 is a perspective view of the device of FIG. 12.
FIG. 19 is a partial, cross-sectional view taken along the line XIX—XIX in FIG. 18 and showing shearing members in the probe grooves and the first and second shear pins.
FIG. 20 is a partial, cross-sectional view taken along the line XX—XX in FIG. 18 and showing the means for pivotally mounting the probe second end to the bumper which is shown in phantom line.

Referring to FIG. 18, the energy absorbing or braking device 11 comprises an elongated probe 142 similar to the probe 89 of FIG. 8, except for the following changes. The probe 142 has preferably four grooves 143 instead of six, contains a lightening hole 144 which extends longitudinally through the probe, while the probe of FIG. 8 has none, one end of the probe 142 (FIG. 18) is pivotally and slidably connected to the bumper 136 or 137 rather than being fixedly connected to an object to be braked, and the other end of the probe extends through the second structure open end 147 instead of being coaxially spaced therefrom.

The probe 142 has a second or proximal end 148 and a first or distal end 149. The probe 142 has a longitudinal axis 145 and a generally rectangular cross-sectional shape. Two oppositely facing side surfaces 173 of the probe 142 each have two longitudinal grooves 143 formed therein. The grooves 143 have substantial extension along the probe longitudinal axis 145. The second end 148 of the probe 142 is provided with means (FIG. 20) for pivotally mounting the probe on the bumper 136 or 137, which means comprises at least one bolt hole 150 therethrough, which bolt hole is parallel to the surfaces of the probe containing the grooves 143. The first end 149 (FIG. 18) of the probe 142 extends through the second structure open end 147 (more fully discussed later). As previously mentioned, a lightening hole 144 coaxially extends through the probe and opens through the probe first and second ends 149, 148. Each probe second end 148 is removably and pivotally mounted on the bumper 136 or 137 by means 153 comprising, for example, two parallel lugs 153 rigidly attached to the bumper, which lugs each have a slot 154 aligned and in register with each other. Each probe second end 148 slidably extends between and in contact with the two lugs 153. A bolt 151 extends through the lug slots 154 and the probe bolt hole 150, and a nut 152 secures the bolt in place. The bolt 151 is slidable in the lug slots 154, the length and shape of which slots are sized to enable relative lateral movement (as well as pivotal movement) of the probe second end 148 with respect to the bumper 136 or 137 when the probe 142 is moved further into the second structure 146 (described later) and toward the second structure closed end 155. This lateral and pivotal movement of the probe second end 148 prevents the probe 142 from becoming misaligned with the second structure 146 as the probe moves deeper into the second structure. Since there is clearance between the probe surfaces 173 which contain the grooves 143 and the corresponding internal surfaces of the second structure 146, misalignment of the probe 142 with the second structure could cause interference or binding between the probe first end 149 and the internal surfaces of the second structure, thus resulting in a malfunction by the device 11. Without the slots 154 in the bumper lugs 153, an impact or force received by the bumper 136 or 137 is transmitted to the probe 142 in such a manner as to impose a side load on the probe second end 148, and any side load imposed on the probe second end causes the probe to move out of register and alignment with the second structure 146.

The second structure 146 preferably comprises one end portion of one side of the automobile frame 138 to form a part of a tubular, second structure 146 of generally rectangular cross-section. Whether the automobile frame consists of U-shaped channels or I-beams, an appropriate structural addition readily produces the required tubular, second structure 146. For instance, if the automobile frame consists of U-shaped channels, another portion of a U-shaped channel 177 similar to that which the automobile frame 138 is constructed is rigidly mounted on the automobile frame to form a substantially square, hollow second structure 146 having an open end 147 and a closed end 155. As previously mentioned, the probe first end 149 slidingly extends through the second structure open end 147. The probe surfaces 174 which do not contain the grooves 143 are in sliding contact with associated interior surfaces of the second structure 146, while the probe surfaces 173 which contain the grooves are spaced from the associated interior surfaces of the second structure. The clearance between the probe surfaces 173 and the associated interior surfaces of second structure 146 is large enough to enable the combined probe and strips of sheet material 172 mounted thereon to pass freely into the second structure. The second structure closed end 155 is not essential, but is desirable if additional shock-absorbing capability is required without lengthening the probe. Such additional shock-absorbing capability can readily be acquired, for example, by the positioning of a piece of lead or other malleable material (not shown) between the probe first end 149 and interior surface of the closed end 155 of the second structure 146. The piece of lead is deformed and extruded into the probe lightening hole 144 when the probe first end 149 rams into contact with the lead and squeezes the lead against the interior surface of the second structure closed end 155.

A first shear pin 156 extends through the second structure 146 in the vicinity of the second structure open end 147 and that portion of the probe 142 which extends into the second structure. The first shear pin 156 is primarily required to prevent the bumper 136 or 137 and probe 142 from separating from the second structure 146. This separation could easily occur when, for example, the automobile 135 is moving forward and then suddenly is stopped.

A first structure 157 is mounted on the probe 142 nearer the first end 149 of the probe 142 than the second end 148 and in contact with the second structure open end 147. Referring additionally to FIG. 19, the first structure 157 comprises two elongated, parallel plates 158 each having a side surface 159 in contact with a respective one of the two oppositely facing probe surfaces 174 which do not contain grooves 143 and two shafts 160, each of which shafts has two discs 161 formed or carried thereon. Each first structure plate 158 has first and second end portions 162, 163 which extend laterally in opposite directions beyond the probe surface that the particular plate is in contact with. Consequently, portions of the plate side surface 159 of one of the plates 158 extend laterally beyond the probe and mutually confront corresponding portions of the side surface of the other plate. Each of the first and second end portions 162, 163 of each plate 158 further has an aperture 164 therethrough. The apertures 164 penetrate and are perpendicular to the plate side surfaces 159. The apertures 164 of the plate first end portions 162 are in register and mutually aligned with each other, and the apertures of the plate second end portions 163 are likewise in register and mutually aligned with each other. A second shear pin 165 extends through the probe 142 and first structure plates 158. The second shear pin 165 is perpendicular to first structure side surfaces 159 and intermediate the plate first and second end portion apertures 164.

One of the shafts 160 is rotatably mounted in the plate first end portion apertures 164 and the other shaft is rotatably mounted in the apertures 164 of the plate second end portions 163. Such rotatable mounting of the shafts is effected by, for example, the use of bushings 166, each having a flange 167 on one end. The bushing flanges 167 are all in contact with that plate surface opposite to the plate side surface 159. Each shaft 160 has first and second end portions 168, 169 which extend through the plate apertures 164 and bushings 166. The shaft first and second end portions 168, 169 are threaded for receiving nuts 170, the nuts being for locking the shafts 160 in the plate apertures 164. The diameters of the discs 161 of each shaft 160 are substantially equal. Each of the shaft discs or circular flanges 161 has a cylindrical, peripheral outer face 171 which has a width slightly less than the width of the probe grooves 143. The discs 161 of one shaft 160 are in register and extend into the grooves 143 of one of the two probe surfaces which contain grooves, and the circular discs of the other shaft are in register and extend into the grooves of the other probe surface. The disc peripheral outer faces 171 are spaced from the bottoms of their respective grooves 143 by the distance equivalent to the thickness of strips of sheet material 172, discussed later.

With reference to FIG. 18, a strip of sheet material 172 is removably mounted on each probe surface 173 containing the grooves 143 and is in contact with its respective surface 173 and covers the probe grooves 143. The width of each of the strips 172 is substantially equal to the width of its associated probe surface 173. One end of one of the strips 172 confronts discs 161 of one of the shafts 160, and the corresponding end of the other strip confronts the discs of the other shaft. The other ends of the strips confront the automobile bumper 136 or 137. The ends of the strips are held in position by, for example, flat-headed, self-tapping, sheet-metal screws 175.

In operation, at least two kinetic energy or impact absorbing devices 11 are mounted in the above-described manner between each front and rear bumpers 136, 137 and the automobile frame 138. The first shear pin 156 of each device prevents the accidental separation of the probe 142 and bumper 136 or 137 from the automobile frame 138. The second shear pin 165, in cooperation with the first shear pin 156, enables the automobile bumper 136 or 137 to withstand forces and impacts up to the shearing capacity of the combined shear pins. Thus, an automobile 135 incorporating the subject invention not only has added collision protection, but has the continued convenience of being able to use its bumpers 136 or 137 in the conventional manner (e.g., may use its bumpers for pushing another automobile, pulling a trailer, withstanding moderate impacts, etc.).

Should an automobile accident occur that produces an impact force which exceeds the shearing capacity of the first and second shearing pins 156, 165 of the subject device 11, the bumper 136 or 137, the probe 142, and the strips of sheet material 172 tend to move in a direction along the probe axis 145 and toward the second structure closed end 155. This initial tendency of the probe 142 to move transmits the impact force received by the bumper 136 or 137 concurrently to the first and second shear pins 156, 165. As the shear pins 156, 165 are sheared, the probe 142 and strips 172 move relative to the first structure 157, which is prevented from moving because it is already in contact with the second structure open end 147. The initial movement of the probe 142 and the strips of sheet material 172 fixedly and removably attached thereto brings the strip ends 176, formerly confronting the first structure discs 161, into contact with those discs. As the probe 142 with the strips 172 continues to move along the probe axis 145 and in a direction toward the second structure closed end 155, the first structure discs 161 move along the probe grooves 143 in a direction toward the probe second end 148. Concurrent with the rolling of the discs along the probe grooves 148, the discs 161 shear those portions of each strip 172 which cover the probe grooves 143. Once the probe 142 has moved into the second structure 146 to a distance wherein the first structure plates 158 contact the bumper lugs 153, the energy absorption produced by the shearing of the strips 172 is completed. As stated above, a final energy-absorbing technique can readily be incorporated simply by placing a piece of soft, malleable material, such as lead (not shown), against the interior side of the second structure closed end 155 and between the probe second end 149, whereby, just prior to the first structure plates 158 coming into contact with the bumper lugs 153, the probe first end 149 contacts and extrudes the lead into the probe lightening hole 144.

As can be readily seen from FIG. 16, an impact-producing vector in the center of the bumper 136 produces substantially twice as much impact absorption as a single energy absorbing device 11, for both energy absorbing devices are utilized; whereas an impact vector on one end of the bumper (as shown in FIGS. 14 and 17) must be absorbed largely, or even totally, by only one energy-absorbing device.

The above-described modification of the present invention provides a reliable, low-cost kinetic-energy absorber 11 that does not lose effectiveness or operating capability with non-use, for the device is practically free of any need of maintenance. Thus, the device of FIG. 18 provides an excellent, passive shock absorber for infrequent or emergency use by vehicles or helicopters. Further, the device of FIG. 18 is simply and easily reactivated, after use, by the replacement of the low-cost, expendable strips of sheet material 172 and shear pins 156, 165. helicopler While only one embodiment of the invention, together with several modifications thereof, has been described in detail herein and shown in the accompanying drawing, it will be evident that various further modifications are possible in the arrangement and construction of its components without departing from the scope of the invention. For example, it would be obvious to a man skilled in the art to incorporate the subject invention (FIG. 18) between a helicoptor's landing skids and supporting structure. By supporting structure it is meant that structure which is intermediate the landing skids and the helicopter fuselage. The automobile bumper 136 of FIG. 15 is analogous to a helicoptor landing skid, and the automobile frame 138 is analogous to a helicoptor supporting structure.

What is claimed is:

1. A device for braking a linearly moving object, which device comprises:

an elongated probe having first and second ends, a longitudinal axis, a first surface portion parallel to the probe axis, and a second surface portion also parallel to the probe axis, but perpendicular to and interconnecting with the first surface portion, the first and second surface portions having substantial extensions along the probe axis, the interconnection of the first and second surface portions forming a cutting edge, and the probe second end being provided with means for removably mounting the probe on said object to be braked;

a strip of sheet material having an end portion;

means for holding the strip of sheet material on the probe in a position wherein the strip extends along and is in contact with the probe first surface portion, and in which position a portion of the strip extends beyond and overhangs the probe cutting edge;

at least one shearing member having a side face;

means for holding the shearing member on the probe in the vicinity of the probe first end and for positioning the shearing member relative to the probe surface portions between a first position wherein the shearing member is laterally spaced from the probe first surface portion and the shearing member side face is adjacent a plane containing the probe second surface portion and a second position wherein the shearing member is positioned with a portion of its side face adjacent the probe second surface portion, the holding and position means being movable along the probe in a direction extending away from the probe first end and toward the probe second end; and a structure having an open end, the structure open end having a center and being positioned between the first end of the probe and a reference plane which is perpendicular to the probe axis, the structure being fixed relative to the reference plane, the center of the structure open end being aligned with the probe longitudinal axis, and the size of the structure open end being larger than the cross-sectional dimensions of the probe, but smaller than the outside dimensions of the shearing member holding and positioning means, whereby the probe first end enters the structure open end and the shearing member holding and positioning means which is attached thereto is prevented from entering the structure open end when the object to be braked is moved toward and along a path perpendicular to the reference plane, the resulting movement of the holding and positioning means with respect to the probe being accompanied by shearing of the strip of sheet material by the shearing member and cutting edge and braking of said object.

2. The device of claim 1, wherein the strip of sheet material extends between the shearing member and the probe first surface portion when the shearing member is in its first position, whereby during movement of the shearing member from its first position to its second position, the shearing member cooperates with the probe cutting edge and shears and locally deforms that portion of the strip of sheet material which overhangs the probe first surface portion.

3. The device claimed in claim 1, wherein the shearing member is a roller having a circular cutting edge and an axis of rotation perpendicular to the probe axis, the circular cutting edge lying in a plane which is perpendicular to the axis of rotation of the roller, and the roller being rotatably movable relative to the probe.

4. The device of claim 1, wherein the shearing member is a roller bearing said side face and having an axis of rotation perpendicular to the probe axis and a cylindrical outer surface which intersects the side face to form a circular cutting edge, the roller being mounted for rotation relative to the probe.

5. The device of claim 1, wherein a portion of the shearing member, when the shearing member is in its second position, extends along the probe second surface portion in a direction perpendicular to the probe cutting edge and for a distance of at least the thickness of the strip of sheet material, thereby assuring the shearing of the strip.

6. The device of claim 1, wherein the shearing member side face is in contact with the probe cutting edge when the shearing member is in its second position.

7. The device of claim 1, the probe further having a rectangular cross-sectional shape and third and fourth surface portions which are parallel to and extend along the probe axis, the probe third surface portion being perpendicular to the probe second and fourth surface portions, and wherein the means for holding and positioning the shearing member comprises supporting frame members rigidly held together and in sliding contact with the probe surface portions by fastening means.

8. The device of claim 7, wherein the fastening means comprises a plurality of bolts and nuts, and wherein the supporting frame members comprise:

a base frame having a face in sliding contact with the probe third surface portion and two, opposite end portions which extend beyond the probe third surface portion in a direction perpendicular to the probe axis, which end portions each contains at least one aperture having an axis parallel to the probe second and fourth surface portions;

two wall frames each having two, opposite ends and at least one longitudinal passageway therethrough, the at least one passageway of each wall frame opening through the opposite ends of that respective wall frame, each wall frame being mounted on a respective one of the base frame end portions with one of the wall frame ends being in contact with the base frame end portion associated therewith, the at least one passageway of one wall frame being in register and aligned with the at least one aperture in one end portion of the base frame and the at least one passageway of the other wall frame being in register and aligned with the at least one aperture of the other base frame end portion, each wall frame having a face, the wall frame faces mutually facing each other, and a portion of one of the wall frame faces being in sliding contact with a respective one of the probe second and fourth surface portions, and a portion of the face of the other wall frame being in sliding contact with the other of the probe second and fourth surface portions, each of said bolts extending through a one of said wall frame passageways and a one of said base frame apertures aligned therewith and being provided with a respective one of said nuts; and a generally cylindrical shaft having an axis perpendicular to the probe axis and parallel to the probe first surface, and shaft being mounted on the wall frames adjacent and between the two wall frame ends which are opposite the wall frame ends in contact with the base frame, said shearing member being mounted on the shaft.

9. The device of claim 8, wherein:

the shaft is mounted for rotation with respect to the two wall frames and is in rolling contact with the strip of sheet material when the shearing member is in its second position; and the shearing member is a circular disc fixedly mounted on the shaft and having an axis coinciding with the shaft axis, whereby the shaft and shearing member roll when moving relative to the strip.

10. The device of claim 8, wherein:

the shaft is fixed relative to the wall frames and is in sliding contact with that portion of said strip of sheet material which lies in contact with the probe first surface portion; and the shearing member is fixed relative to the shaft, whereby both the shaft and shearing member slide against the strip of sheet material when moving relative thereto.

11. The device of claim 8, wherein:

the wall frames each have a mutually aligned aperture for mounting the shaft, the wall frame apertures having axes which are perpendicular to the probe axis, parallel to the probe first surface, and coaxial with each other;

the shaft ends are provided with means for removably securing the shaft in the wall frame apertures; and a portion of at least one of the wall frame faces which slidingly contacts a respective one of the probe surfaces is cut away to provide clearance for said shearing member.

12. A device for braking a linearly moving object, which device comprises:

an elongated probe having a proximal end, a distal end, a longitudinal axis, and a surface having extension along the axis for at least a major portion of the distance separating the ends, at least one square-edged, longitudinal groove formed in the probe surface and parallel with the probe axis, and the proximal end of the probe being provided with means for removably mounting the probe on said object to be braked;

at least one strip of sheet material extending along and in contact with the probe surface and having a width greater than the probe groove, the strip being positioned to cover the probe groove;

means for holding the strip of sheet material on the probe in its above-said position and against motion along the probe longitudinal axis;

a first structure having an interior and containing at least one cylindrical roller, the first structure being removably and longitudinally slidably mounted on the probe and in the vicinity of the probe distal end and over the strip of sheet material covering the probe groove, the roller being rotatably mounted in the first structure and having an axis of rotation perpendicular to the probe axis, the roller being of a width less than and extending into the probe groove through and in contact with the strip, a portion of the strip of sheet material covering the probe groove and contacting the roller being sheared and deformed around that portion of the roller which extends into the probe groove, the roller being movable along the probe groove by sliding of the first structure along the probe axis and spaced from the bottom of the probe groove by at least the thickness of the strip of sheet material sheared and deformed therearound; and a second structure having an open end, the second structure open end having a center and being positioned between the distal end of the probe and a fixed reference plane which is perpendicular to the probe axis, the second structure being fixed relative to the reference plane, the center of the second structure open end being aligned with the probe longitudinal axis, and the size of the second structure open end being larger than the cross-sectional dimensions of the probe and being smaller than the outside dimensions of the first structure, whereby the probe distal end enters the second structure open end and the first structure which is attached thereto is prevented from entering the second structure open end when the object to be braked is moved toward and along a path perpendicular to the reference plane, the resulting relative movement of the first structure with respect to the probe being accompanied by shearing of the strip of sheet material by the roller and braking of said object.

13. The device claimed in claim 12, the first structure further having at least one shaft rotatably mounted therein and spaced from the strip of sheet material, and the roller being rigidly mounted on the shaft.

14. The device claimed in claim 12, wherein the second structure is a pipe, and the strip of sheet material is metal.

15. The device claimed in claim 12, wherein the means for holding the strip of sheet material is fixedly positioned between the first structure and the probe distal end and has cross-sectional dimensions smaller than the second structure open end, the first structure having a surface which interferes with the holding means upon movement of the first structure toward the probe distal end, whereby the means for holding the strip also prevents the first structure from sliding off the probe.

16. In combination with a test-rig of the type having parallel guide rails which are perpendicular and fixedly mounted with respect to a reference plane and further having a movable platform parallel with the reference plane and slidably mounted on the guide rails for movement therealong, means for dissipating kinetic energy of the platform and an object carried thereby with a relatively constant absorbing force for braking said platform and object, which means comprises:

an elongated probe having a longitudinal axis, at least one flat, elongated surface parallel with the probe axis, at least one square-edged, longitudinal groove formed in the flat surface of the probe and parallel with the probe axis, the groove having extension along at least a major portion of the probe's length, one end of the probe being removably mounted on and perpendicular to the bottom of the platform;

a strip of sheet material extending along and in contact with the probe surface and having a width greater than the probe groove, the strip being positioned to cover the groove probe;

means for holding the strip of sheet material on the probe in its above-said position and against motion along the probe axis;

a first structure having an interior and containing at least one shaft rotatably mounted therein, the first structure being removably and slidably mounted on the probe end opposite to the one mounted on the platform, the shaft having an axis of rotation perpendicular to the probe axis and parallel to the probe surface having the groove and further having at least one circular flange coaxially formed thereon, the flange having flat sides and a cylindrical, peripheral face, the width of the flange face being less than the width of the probe groove, the flange extending through and in contact with the strip and being rotatably engaged with and movable along the probe groove, the portion of the strip of sheet material covering the probe groove and contacting the flange being sheared and deformed around that portion of the flange which engages the probe groove, and the flange face being spaced from the bottom of the probe groove by the thickness of the strip of sheet material sheared and deformed therearound; and a second structure having an open end, the second structure open end having a center and being positioned between the probe end opposite to the one mounted on the platform and the reference plane, the second structure being fixed relative to the reference plane, the center of the second structure open end being aligned with the probe longitudinal axis, and the size of the second structure open end being larger than the cross-sectional dimensions of the probe, but smaller than the outside dimensions of the first structure, whereby movement of the probe through the second structure open end and concurrent contact of the first structure with the second structure open end results in movement of the probe relative to the first structure when the platform is moved toward the reference plane, the resulting relative movement of the probe with respect to the first structure being accompanied by shearing of the strip of sheet material by the circular flange and braking of said platform and object.

17. A device for absorbing kinetic energy of a linearly moving object, which device comprises:

an elongated probe having a proximal end, a distal end, a longitudinal axis, and at least one surface having extension along the axis for at least a major portion of the distance separating the ends, and at least one square-edged, longitudinal groove formed in the probe surface and parallel with the probe axis;

means for removably and pivotally mounting the probe proximal end on the object to be braked, the mounting means further providing for lateral movement of the probe proximal end relative to the probe longitudinal axis;

at least one strip of sheet material having an end portion and extending along and in contact with the probe surface and having a width greater than the probe groove, the strip being positioned to cover the probe groove;

means for holding the strip of sheet material on the probe in its above-said position and against motion along the probe longitudinal axis;

at least one cylindrical roller having an outer peripheral surface which has a width less than the probe groove, the roller extending into the probe groove;

a first structure removably and longitudinally slidably mounted on the probe and at a location nearer the probe distal end than the probe proximal end, the roller being rotatably mounted in the first structure and having an axis of rotation perpendicular to the probe axis, the roller being adjacent the strip end portion, spaced from the bottom of the probe groove by a distance substantially equal to the thickness of the strip, and movable along the probe groove by the sliding of the first structure along the probe axis in a direction toward probe proximal end and away from the probe distal end; and a second structure having a longitudinal axis, an open end, and a closed end, the second structure having an elongated, hollow interior, the second structure axis being coincident with the probe longitudinal axis, the probe distal end having slidable extension through the second structure open end and being spaced from the second structure closed end, the first structure having at least one surface in contact with the second structure open end, and the size of the second structure open end being larger than the combined cross-sectional dimensions of the probe and the strip of sheet material in its above-said position on the probe, but being smaller than the outside dimensions of the first structure, whereby the probe distal end moves toward the interior side of the second structure closed end and the first structure is held in contact with the second structure open end when said object receives an impact force and is moved along with the probe toward the second structure closed end, the resulting relative movement of the first structure with respect to the probe being accompanied by shearing of the strip of sheet material by the roller and the absorbing of the impact force imparted to the object to be braked.

18. The device claimed in claim 17, wherein:

the probe has a coaxial lightening hole extending longitudinally therethrough; and said means for removably and pivotally mounting the probe proximal end on the object to be braked comprises a bolt and nut and two parallel lugs having slots which are aligned and in register with each other, the lugs being rigidly attached to the object to be braked, the probe proximal end extending between and in slidable contact with the lugs, the bolt extending through the lug slots and probe proximal end, the bolt being secured in place by the nut and slidable along the lug slots, thereby enabling lateral as well as pivotal movement of the probe proximal end.

19. A device for absorbing kinetic energy of a linearly moving vehicle having a frame and at least one bumper, which device comprises:

an elongated probe having an proximal end, a distal end, a longitudinal axis, and at least one surface having extension along the axis for at least a major portion of the distance separating the ends, at least one square-edged, longitudinal groove formed in the probe surface and parallel with the probe axis, and the proximal end of the probe being provided with means for removably and pivotally mounting the probe on said vehicle bumper and enabling lateral movement of the probe proximal end relative to the probe longitudinal axis;

at least one strip of sheet material having an end portion and extending along and in contact with the probe surface and having a width greater than the probe groove, the strip being positioned to cover the probe groove;

means for holding the strip of sheet material on the probe in its above-said position and against motion along the probe longitudinal axis;

a first structure containing at least one cylindrical roller, the first structure being removably and longitudinally slidably mounted on the probe and at a location nearer the probe distal end than the probe proximal end, the cylindrical roller being adjacent the strip end portion, the roller being rotatably mounted in the first structure and having an axis of rotation perpendicular to the probe axis, the roller having a width less than and extending into the probe groove, the roller being spaced from the bottom of the probe groove by a distance substantially equal to the thickness of the strip, the roller being movable along the probe groove by the sliding of the first structure along the probe axis in a direction toward probe proximal end and away from the probe distal end; and a second structure having a longitudinal axis, an open end, and a closed end, the second structure having an elongated, hollow interior and being fixedly located with respect to the vehicle frame, the second structure axis being coincident with the probe longitudinal axis, the probe distal end having slidable extension through the second structure open end and being spaced from the second structure closed end, the first structure having at least one surface in contact with the second structure open end, and the size of the second structure open end being larger than the combined cross-sectional dimensions of the probe and the strip of sheet material in its above-said position on the probe, but being smaller than the outside dimensions of the first structure, whereby the probe distal end moves toward the interior side of the second structure closed end and the first structure is held in contact with the second structure open end when the bumper receives an impact force and is moved along with the probe toward the second structure, the resulting relative movement of the first structure with respect to the probe being accompanied by shearing of the strip of sheet material by the roller and the absorbing of the impact force imparted to the bumper.

* * * * *